(12) United States Patent
Simcoe et al.

(10) Patent No.: US 9,015,481 B2
(45) Date of Patent: Apr. 21, 2015

(54) METHODS AND SYSTEMS FOR ACCESS SECURITY FOR DATALOADING

(75) Inventors: Nathaniel John Simcoe, Phoenix, AZ (US); Steven James Darr, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 636 days.

(21) Appl. No.: 13/032,314

(22) Filed: Feb. 22, 2011

(65) Prior Publication Data

US 2012/0216037 A1 Aug. 23, 2012

(51) Int. Cl.
*H04L 29/06* (2006.01)
*H04L 9/32* (2006.01)
*H04L 29/08* (2006.01)

(52) U.S. Cl.
CPC ............ *H04L 9/3226* (2013.01); *H04L 9/3236* (2013.01); *H04L 63/105* (2013.01); *H04L 63/126* (2013.01); *H04L 67/06* (2013.01); *H04L 67/12* (2013.01)

(58) Field of Classification Search
CPC .................................................... H04L 9/3226
USPC ......................................... 713/168, 150, 151
See application file for complete search history.

(56) References Cited

U.S. PATENT DOCUMENTS

| | | | |
|---|---|---|---|
| 7,293,282 B2 | 11/2007 | Danforth et al. | |
| 7,984,166 B2 | 7/2011 | Simcoe et al. | |
| 2002/0159444 A1* | 10/2002 | Vialen et al. | 370/352 |
| 2002/0184046 A1* | 12/2002 | Kamada et al. | 705/1 |
| 2003/0145073 A1* | 7/2003 | Lee | 709/223 |
| 2005/0005154 A1* | 1/2005 | Danforth et al. | 713/200 |
| 2005/0213567 A1* | 9/2005 | Mullins et al. | 370/352 |
| 2005/0246770 A1 | 11/2005 | Hunt et al. | |
| 2005/0267860 A1 | 12/2005 | Benguigui | |
| 2006/0143475 A1* | 6/2006 | Herbert et al. | 713/191 |
| 2007/0022184 A1* | 1/2007 | Sharma et al. | 709/220 |
| 2008/0028437 A1* | 1/2008 | Zeng | 726/2 |

(Continued)

OTHER PUBLICATIONS

Butcher et al.; Security Challenge and Defense in VoIP Infrastructures; Published in: Systems, Man, and Cybernetics, Part C: Applications and Reviews, IEEE Transactions on (vol. 37 , Issue: 6) pp. 1152-1162; Date of Publication : Nov. 2007; IEEE Xplore.*

(Continued)

*Primary Examiner* — Bradley Holder
(74) *Attorney, Agent, or Firm* — Fogg & Powers LLC (57) ABSTRACT

Systems and methods for access security for dataloading are provided. In one implementation, a system comprises a first computer that transmits a packet, the first computer comprising: an authentication code memory that stores an authentication code for the packet; a first processing unit that executes communication instructions in a first memory, the communication instructions attaching the authentication code to the packet; and a first communication port that transmits the packet. The system also comprises a second computer that receives the packet, the second computer comprising: a second communication port that receives the packet; a verification code memory that stores a verification code for verifying the packet's authentication code; and a second processing unit that executes verification instructions in a second memory, the verification instructions comparing the verification code against the authentication code, wherein the second computer rejects the packet if the verification code does not match the authentication code.

18 Claims, 6 Drawing Sheets

(56) References Cited

U.S. PATENT DOCUMENTS

2008/0168271 A1* 7/2008 Sherburne et al. .......... 713/171
2009/0158383 A1* 6/2009 Taskiran-Cyr ............... 725/132
2010/0107230 A1* 4/2010 Tyagi et al. ..................... 726/6
2010/0217889 A1   8/2010 Simcoe et al.
2012/0143993 A1* 6/2012 Russo et al. ................. 709/219
2012/0144060 A1* 6/2012 Russo et al. ................. 709/234

OTHER PUBLICATIONS

Zimmerli et al.; Resource management portal for laboratories using real devices on the Internet; Published in: Newsletter ACM SIGCOMM Computer Communication Review Homepage archive; vol. 33 Issue 3, Jul. 2003; pp. 145-151; ACM Digital Library.*

* cited by examiner

METHODS AND SYSTEMS FOR ACCESS SECURITY FOR DATALOADING

BACKGROUND

Current aircraft dataload standards rely on Trivial File Transfer Protocol (TFTP), which has no built in access security. As such, an operating TFTP server will service all inbound TFTP read requests and TFTP write requests, exposing the TFTP server to malicious TFTP read and write requests. With the inclusion of wireless access on an aircraft, rogue computers could connect to the TFTP server and send malicious TFTP read and write requests to the server. Further, software with low design assurance can also connect to the TFTP server and, due to the low level of design assurance, the software could send an errant command to the TFTP server. The errant command could invalidate the configuration of the system without being noticed by supervisory programs that were created with a high level of design assurance.

SUMMARY

Embodiments of the present invention provide systems and methods for driving an optical modulator and will be understood by reading and studying the following specification.

In one implementation, a system for secure TFTP communication comprises a first computer configured to transmit a packet, where the first computer comprises: an authentication code memory configured to store an authentication code for the packet; a first processing unit configured to execute communication instructions stored in a first memory, the communication instructions configured to attach the authentication code to the packet; and a first communication port configured to transmit the packet. The system for secure TFTP communication also comprises a second computer configured to receive the packet from the first computer, where the second computer comprises: a second communication port configured to receive the packet; a verification code memory configured to store a verification code for verifying the authentication code in the packet; and a second processing unit configured to execute verification instructions stored in a second memory, the verification instructions configured to compare the verification code against the authentication code received in the packet, wherein the second computer rejects the packet if the verification code does not match the authentication code.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Figure 1:
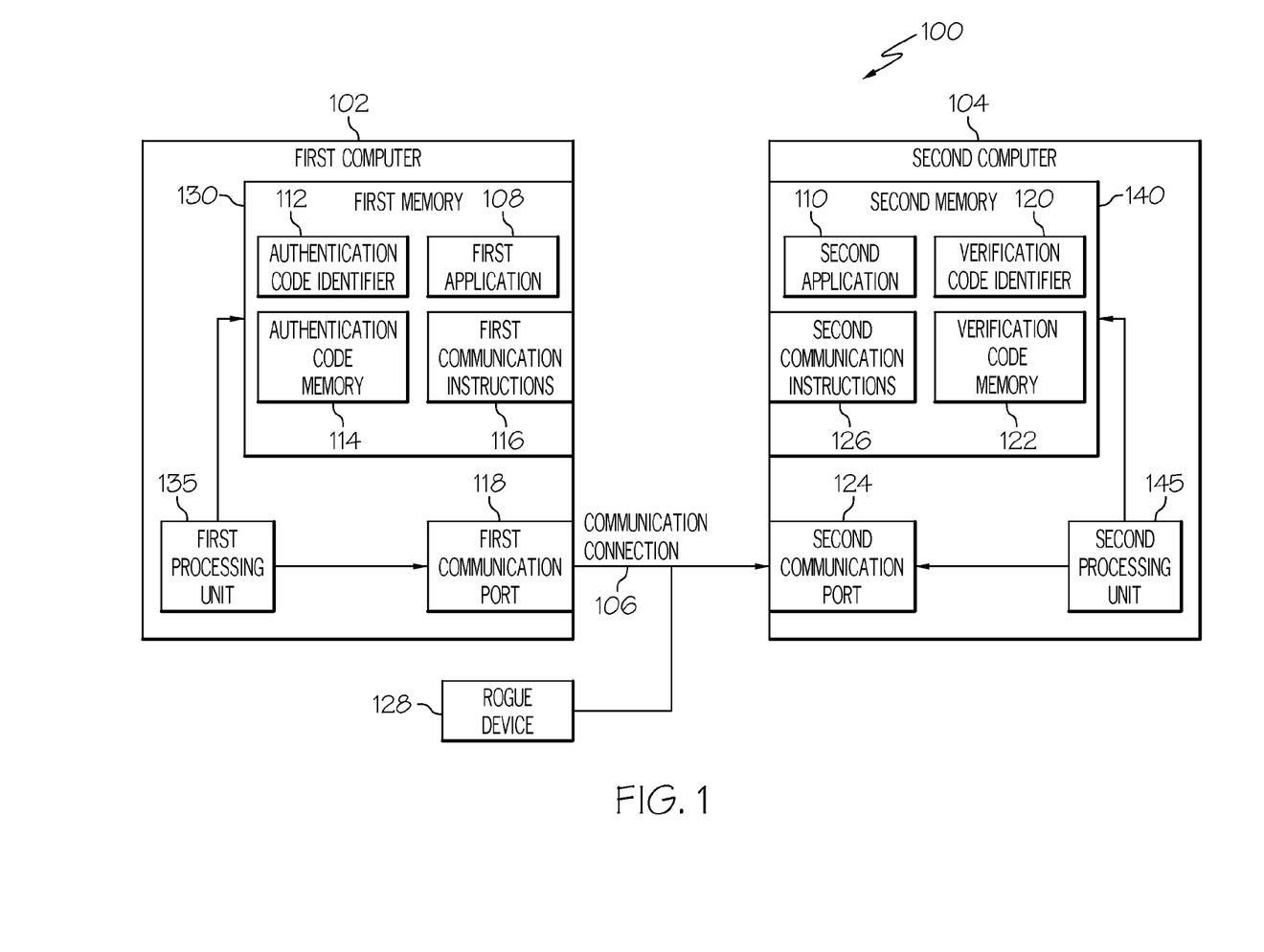
FIG. 1 is a block diagram depicting one embodiment of a system implementing TFTP authorization between a first and second computer.

FIG. 1 is a block diagram depicting one embodiment of a system 100 implementing TFTP authorization between a first and second computer. System 100 includes a first computer 102 configured to communicate through a communication connection 106 with a second computer 104. For example, where second computer 104 is a data loader, first computer 102 connects through communication connection 106 with second computer 104 to load information, like flight information, onto first computer 102 from second computer 104. Also, first computer 102 communicates with second computer 104 through communication connection 106 using trivial file transfer protocol (TFTP). Further, first computer 102 includes a first application 108, which includes instructions stored in a first memory 130 and executed by a first processing unit 135, and second computer 104 includes a second application 110, which includes instructions stored in a second memory 140 and executed by a second processing unit 145. First processing unit 130 and second processing unit 140 are electronic devices that execute machine-readable instructions. First application 108 and second application 110 are computer instructions stored in a memory device, that cause a processing unit to control the operation of first computer 102 and second computer 104, respectively. For example, when first processing unit 135 executes first application 108 on first computer 102, first processing unit 135 initiates the sending of data packets to and handles data received from second computer 104 over communication connection 106. The data packets transmitted by first computer 102 include read data requests and write data requests that are handled by second processing unit 145 executing second application 110 on second computer 104.

When first computer 102 communicates with second computer 104 using TFTP over communication connection 106, first computer 102 and second computer 104 provide additional security to protect both first computer 102 and second computer 104 from security risks that are inherent with TFTP communication. To add the additional security to the TFTP communication, first computer 102 includes an authentication code identifier 112 that includes instructions stored in first memory 130 that are executed by first processing unit 135. When first processing unit 135 executes authentication code identifier 112, first processing unit 135 identifies an authentication code that is attachable to a data packet that is transmissible over communication connection 106. The term "authentication code," as used herein, refers to an identifying digital value that allows another computer to authenticate the source of a data packet. Upon reception, by another computer, of a data packet having an authentication code, the other computer can use the authentication code to certify that the data packet originated from a trusted source. For example, first computer 102 appends an authentication code to the data packet before transmission of the data packet to second computer 104. Second computer 104 uses the authentication code to certify that the data packet originated at first computer 102.

In some implementations, first processing unit 135, executing authentication code identifier 112, identifies an authentication code for each data packet by selecting authentication codes from a predefined set of possible authentication codes. In a further implementation, first processing unit 135, executing authentication code identifier 112, can generate authentication codes using a complex proprietary algorithm, a hashing function, a CRC value, and the like. Alternatively, first processing unit 135, executing authentication code identifier 112, identifies authentication codes from a set of authentication codes received from second computer 104 or other electronic device. In certain implementations, first processing unit 135, executing authentication code identifier 112, identifies a different authentication code for each data packet transmitted from first computer 102 to second computer 104 over communication connection 106. In an alternative implementation, where first processing unit 135, executing authentication code identifier 112, identifies an authentication code from a predefined list of authentication codes, first processing unit 135 identifies authentication codes from a long list of authentication codes that contain enough authentication codes to prevent an unauthorized device, such as an external sniffer, from determining a pattern of authentication codes from analyzing data passed across communication connection 106 between first computer 102 and second computer 104. When first processing unit 135 identifies an authentication code, first computer 102 can store the authentication code in an authentication code memory 114 in first memory 130.

First computer 102 also includes a first communication instructions 116 stored in first memory 130 and executed by first processing unit 135. First communication instructions 116, upon execution by first processing unit 135, are configured to format the data packet to include the authentication code for transmission across communication connection 106 to second computer 104. In certain embodiments, first communication instructions 116 are also configured to add an authentication option to the data packet. The authentication option, when received by second computer 104, indicates that the data packet contains authentication information. For example, when the data packet contains an authentication option, the authentication option indicates that the data packet also contains an authentication code. Further, first processing unit 135, executing first communication instructions 116, extracts an authentication code from authentication code memory 114 and appends it to the data packet.

First computer 102 and second computer 104 and the applications thereon include or function with software programs, firmware or other computer readable instructions for carrying out various methods, process tasks, calculations, and control functions, used in implementing the functionality described above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CDROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
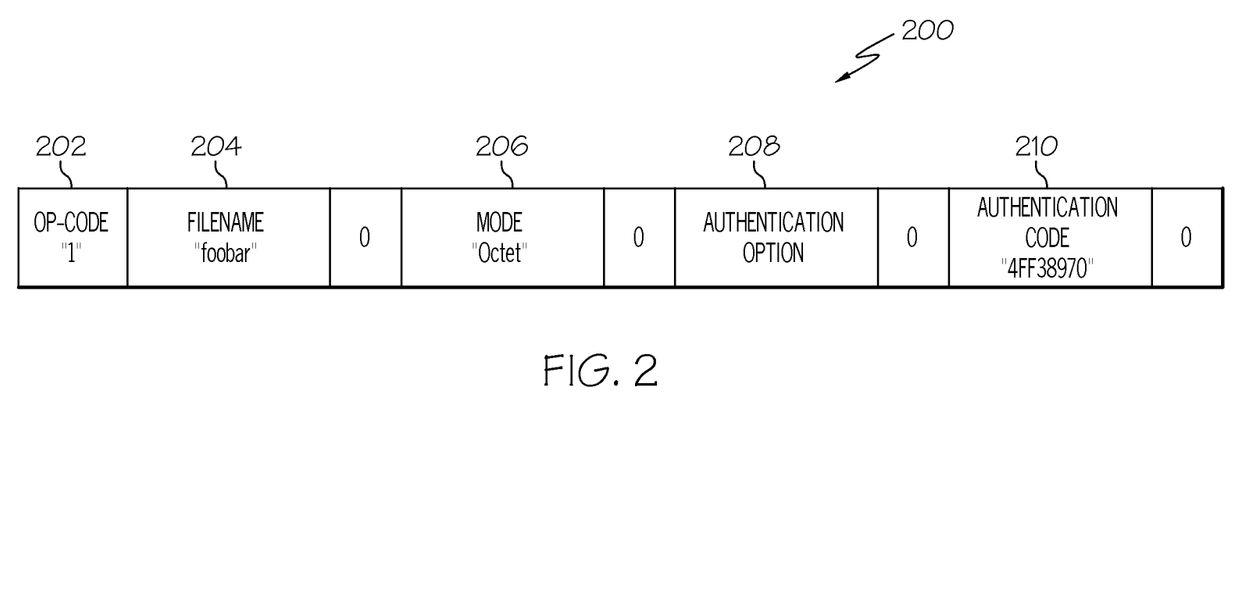
FIG. 2 is an exemplary diagram of a TFTP data packet modified to include an authentication option.

FIG. 2 is an exemplary diagram of a TFTP packet 200 formatted by first processing unit 135 executing first communication instructions 116. First processing unit 135 has formatted TFTP packet 200 to include an operation code 202. The term "operation code," as used herein, is a code attached to TFTP packet 200 provides direction to the receiving computer on how to handle TFTP packet 200. In some implementations, TFTP packet 200 is a request to either write to a file on second computer 104 or read a file from second computer 104. Based on the value of operation code 202, second computer 104 identifies whether TFTP packet 200 is a request to read a file or write a file. For example, when TFTP packet 200 is a read request, operation code 202 could have a value of "1". Alternatively, when TFTP packet 200 is a write request, operation code 202 could have a value of "2". It is to be understood that the operation codes discussed here are provided by way of example and not by way of limitation. In particular, it is to be understood that other operation codes, such as delete, can be used in other embodiments.

Further, TFTP packet 200 includes a filename 204. Depending on the value of operation code 202, filename 204 instructs second computer 104 as to which file is requested to be read or requested to be written. For example, when operation code 202 indicates that TFTP packet 200 is a read request and the filename 204 indicates that the filename is "foobar," TFTP packet 200 instructs second computer 104 that first computer 102 is requesting to read the file "foobar" on second computer 104. If operation code 202 indicates that TFTP packet 200 is a write request, TFTP packet 200 instructs second computer 104 that first computer 102 is requesting to write to the file "foobar" on second computer 104.

In at least one implementation, where TFTP packet 200 is a file transfer from first computer 102 to second computer 104, or a file transfer from second computer 104 to first computer 102, TFTP packet 200 includes a mode 206. Mode 206 indicates the file transfer mode for the file indicated by filename 204. Possible file transfer modes indicated by mode 206 include, but are not limited to, netascii, bin, octet, mail, and the like. For example, first computer 102 can transmit TFTP packet 200 requesting that the file named "foobar", as indicated by filename 204, be transmitted from second computer 104 to first computer 102 in octet mode, as shown by mode 206.

In a further implementation, TFTP packet 200 includes an authentication option 208. Option 208 indicates to the receiving computer that TFTP packet 200 includes an authentication code. TFTP packet 200 also includes an authentication code 210. First processing unit 135, executing first communication instructions 116, appends authentication option 208 and authentication code 210 to TFTP packet 200.

When first processing unit 135 in FIG. 1, executing first communication instructions 116, completes the formatting of a data packet, the data packet is passed to first communication port 118. First communication port 118 stores data packets received from first processing unit 135 in a stack or queue for transmission over communication connection 106. First communication port 118 connects to communication connection

106, by way of example and without limitation, through an Ethernet adapter, a telephone modem, a wireless adapter, and the like. Communication connection 106 is either a wireless or physical connection between first communication port 118 of first computer 102 and a second communication port 124 of second computer 104. For example and without limitation, communication connection 106 connects first communication port 118 to second communication port 124 via a telephone cable, an Ethernet cable, or a wireless communication link.

Second computer 104 is configured to receive and act upon data packets received from first computer 102 over communication connection 106. Second computer 104 includes second application 110 stored in a second memory 140. Second application 110 includes instructions that cause second processing unit 145 to function in a similar manner as first processing unit 135 upon executing first application 108. For example, where first processing unit 135 on first computer 102 sends data packets to and receives information from second computer 104 second processing unit 145, upon executing second application 110, receives data packets from first computer 102 and sends information to first computer 102. Further, first processing unit 135, executing second application 110, is configured to receive data packets transmitted from trusted sources.

To prevent second application 110 from receiving data packets from non-trusted sources, second computer 104 includes verification code identifier 120 stored as instructions in second memory 140. Second processing unit 145, upon executing verification code identifier 120, functions in a similar manner to first processing unit 135 upon executing authentication code identifier 112. In one implementation, second processing unit 145, executing verification code identifier 120, generates codes and transmits the generated codes to first computer 102 through a secure connection. In an alternative implementation, second processing unit 145, executing verification code identifier 120, and first processing unit 145, executing authentication code identifier 112, generate verification codes and authentication codes using the same complex algorithm. Further, second processing unit 145, executing verification code identifier 120, and first processing unit 145, executing authentication code identifier 112, identify verification codes and authentication codes from the same list of code values. In a similar manner to first processing unit 135, second processing unit 145 stores the identified code in verification code memory 122 which is similar to authentication code memory 114.

Second computer 104 also includes second communication port 124. As was previously mentioned, second communication port 124 transmits and receives information over communication connection 106. For example, second communication port 124 receives data packets from first communication port 118 over communication connection 106. Second communication port 124 functions similarly to first communication port 118.

In one embodiment, after second communication port 124 receives a data packet over communication connection 106, second communication port 124 sends the data packet to second processing unit 145, which handles the data packet by executing second communication instructions 126 that are stored in second memory 140. Second processing unit 145, executing second communication instructions 126, is configured to receive the data packet and verify that the data packet has the authentication option and the correct authentication code. To verify that the data packet possesses the authentication option and authentication code, second communication instructions 126 instruct second processing unit 145 to verify that the data packet is formatted to include the authentication option. If the data packet fails to include an authentication option, second communication instructions 126 instruct second processing unit 145 to reject the data packet and not process the data packet with second application 110. In one implementation, second communication instructions 126 direct second processing unit 145 to respond to a data packet lacking the required option by transmitting an error packet back over communication connection 106 to first computer 102. For example, second communication instructions 126 instruct second processing unit 145 to form an error packet containing an error code and an error message for transmission to first computer 102, the error code corresponding to a previously identified error, and the error message describing the error. For instance, the error code may be "4" and the error message may say "TFTP_Op_Not_Authorized". The error code and error message are provided as examples, and other messages and codes that perform a similar function can be used. When the data packet does not include the authentication option, second communication instructions 126 direct the second processing unit 145 to abort the operation requested by the data packet.

In some implementations, second communication instructions 126 instruct second processing unit 145 to check the data packet to verify that the data packet possesses the correct authentication code. Second communication instructions 126 direct second processing unit 145 to pull an expected verification code from verification code memory 122. Second processing unit 145 then compares the expected verification code with an authentication code identified in the data packet. If the verification code matches the authentication code, second processing unit 145 executes second application 110 for further processing of the data packet.

In one implementation, where second communication instructions 126 instruct second processing unit 145 to verify that the authentication code and the verification code match, second communication instructions 126 direct second processing unit 145 to transmit an acknowledgement to the originating computer. For example, when second computer 104 receives a data packet from first computer 102 and second communication instructions 126 instruct second processing unit 145 to verify that the authentication code contained in the data packet matches the verification code, second processing unit 145 transmits the verification code back to first computer 102 indicating that second computer 104 will process the request contained in the data packet. In contrast to the situation where the authentication code matches the verification code, if the authentication code and the verification code fail to match, second computer 104 will transmit an error packet back to the originating computer. For example, when a first computer 102 originally sends a data packet to a second computer 104 and the authentication code contained in the packet fails to match the verification code identified by second processing unit 145, second computer 104 transmits an error code of "8" signifying the type of error that occurred and an error message of "Key_Invalid" describing the type of error that occurred. The error code and error message are provided as examples, and other messages and codes that perform a similar function can be used. In some implementations, upon determining that the authentication code and verification code do not match, second processing unit 145 aborts the operation requested by the data packet.

As has been shown with regards to system 100, first computer 102 sends data packets containing requests to second computer 104, where second computer 104 verifies that the data packets include the authentication option and authentication code. First computer 102 can also possess the same functionality as second computer 104. That is, second computer 104 can also send data packets containing requests to first computer 102, where first computer 102 verifies that the data packets include the authentication option and authentication code. By requiring a specific authentication code and authentication option in each data packet received, second computer 104 and first computer 102 can be protected from processing malicious read and write requests from a rogue device 128.

At times rogue device 128 may send rogue data packets to second computer 104. The rogue data packets may contain malicious read and write requests that can compromise the integrity of second computer 104. As second computer 104 will not process a request in a data packet unless the data packet has both an authentication option and an authentication code, second computer 104 will abort any requests contained in data packets received from rogue device 128.

However, the integrity of either first computer 102 in FIG. 1 or second computer 104 in FIG. 1 is not only subject to risks from rogue devices that pose an external risk to system 100. First computer 102 and second computer 104 are also subject to risks from software executing on first computer 102 and second computer 104. In particular, certain systems contain software that is operating at different levels of assurance. For example, a computer can have critical software, wherein critical software is software that has been tested and verified against requirements and design such that it has a high level of assurance that it will operate correctly. A computer can also have low-criticality software, wherein low-criticality software is software that was not sufficiently tested to verify that it will operate correctly, all the time.

Figure 3:
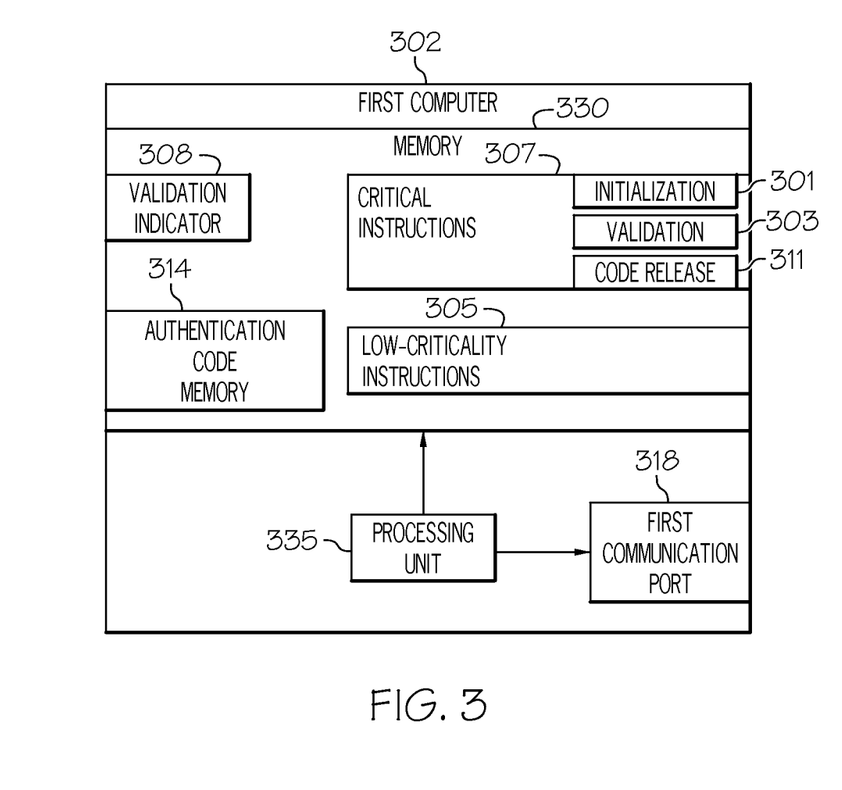
FIG. 3 is a block diagram depicting one embodiment of a computer containing different criticalities of instruction execution.

FIG. 3 is a block diagram depicting a first computer 302 containing both critical software and low-criticality software. First computer 302 functions similarly to first computer 102 in FIG. 1. First computer 302 includes a memory 330, a processing unit 335, and a first communication port 318. Memory 330 functions similarly to first memory 130 in FIG. 1. Memory 330 stores instructions and data having different functions. For example, memory 330 stores validation indicator 308, authentication code memory 314, critical instructions 307 and low-criticality instructions 305. The phrase, "critical instructions," as used herein, refers to instructions that perform a vital role on first computer 302, such that the instructions have been tested and verified such that a processing unit executing the critical instructions will perform an expected behavior all the time. For example, critical instructions may include instructions that control safety critical applications like aircraft safety, engine operation, and the like. The phrase, "low-criticality instructions," as used herein, refers to instructions that direct a processing unit to perform non-vital roles on first computer 302. For example, low-criticality instructions are subjected to less testing and verification as compared to critical instructions. As first computer 302 operates, processing unit's 335 access to the resources of computer 402 (communications ports, memory locations, processing power, and the like) is dependent on whether processing unit 335 executes critical instructions or low-criticality instructions. In some implementations, critical instructions 307 includes initialization instructions 301, validation instruction 303, and code release instructions 311. For example, initialization instructions 301 direct processing unit 335 to initialize first computer 302 for communication with another device using low-criticality instructions 305. Validation instructions 303 instruct processing unit 335 to validate the configuration of first computer 302 after the execution of low-criticality instructions 305 and prepares first computer 302 for further execution of low-criticality instructions 305. Code release instructions 311 direct processing unit 335 to acquire an authentication code from authentication code memory 314.

Figure 4:
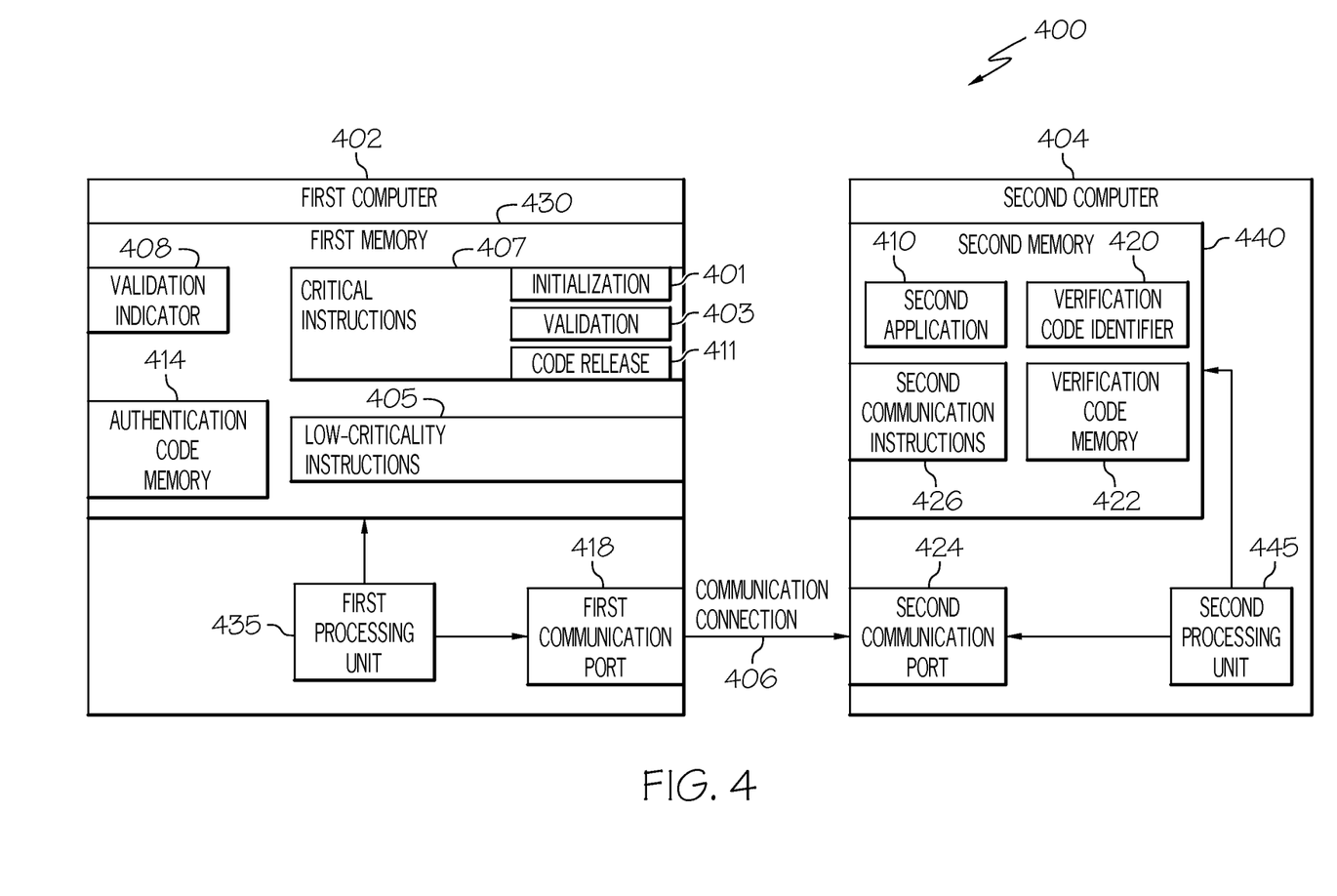
FIG. 4 is a block diagram depicting one embodiment of TFTP communication between computers, where one computer contains different criticalities of instruction execution.

FIG. 4 is a block diagram depicting a system 400 for communicating between a first computer 402 and a second computer 404. First computer 402 is similar to first computer 302 and includes a memory 430 storing critical instructions 407. Critical instructions further includes initialization instructions 401. Initialization instructions 401 instruct first processing unit 435 to identify authentication codes for communicating with second computer 404. First processing unit 435 identifies codes in a similar manner as first processing unit 135 in FIG. 1 executing authentication code identifier 112. Initialization instructions 401 also direct first processing unit 435 to store the identified authentication codes in an authentication code memory 414. Further, first processing unit 435 sends the identified authentication codes to a first communication port 418 for communication with second computer 404.

Second computer 404 functions similarly to second computer 104 in FIG. 1. In some implementations, second processing unit 445 executes only critical software. As second computer 404 receives authentication codes from first computer 402, verification code identifier 420 instructs second processing unit 445 to store the received authentication codes into verification code memory 422. Verification code identifier 420 is similar to verification code identifier 120 in FIG. 1 and verification code memory 422 is similar to verification code memory 122. Further, verification code identifier 420 directs second processing unit to transmit verification codes to a second communication port 424 for communicating the verification codes with first computer 402.

Authentication code memory 414 and verification code memory 422 store several types of authentication and verification codes. For example, a code can be an erase code, a program code, a CRC code, a communication code, and an administrative code. An erase code verifies that a request from first computer 402 to second computer 404 is a command to erase data on second computer 404. A program code verifies that a request from first computer 402 to second computer 404 is a command to execute a program. A CRC code verifies that a request from first computer 402 to second computer 404 is a command to obtain a CRC. A communication code is a set of codes that verifies data exchanges between first computer 402 and second computer 404. An administrative code verifies messages that contain sets of code values and is only available to a processing unit when the processing unit is executing critical instructions.

In one implementation of system 400, first computer 402 and second computer 404 communicate with each other to certify that both first computer 402 and second computer 404 contain the same codes such that second computer 404 will be able to verify communications received from first computer 402. First computer 402 and second computer 404 can also communicate through an encrypted communication connection 406 between first computer 402 and second computer 404. For example, where first processing unit 435 and second processing unit 445 each generate authentication codes using a proprietary algorithm, first computer 402 and second computer 404 communicate with each other to certify that the authentication codes stored in authentication code memory 414 on first computer 402 match the verification codes stored in verification code memory 422 on second computer 404. In another implementation, verification code identifier 420 instructs the second processing unit 445 to generate verification codes and transmit the verification codes over communication connection 406 to first computer 402 to be stored as authentication codes in authentication code memory 414. At least one function associated with initialization instructions 401 is the certification that the authentication codes stored in authentication code memory 414 on first computer 402 match the verification codes stored in verification code memory 422 on second computer 404.

When, first computer 402 contains the appropriate authentication codes for communicating with second computer 404, first processing unit 435 executes low-criticality instructions 405. Low-criticality instructions 405 direct first processing unit 435 to transmit data packets containing read and write requests through first communication port 418 to communicate with second computer 404. To successfully communicate with the second computer 404, first processing unit 435, executing low-criticality instructions 405 needs an authentication code that is stored in authentication code memory 414, where authentication code memory is a critical resource. However, while first processing unit 435 executes low-criticality instructions 405, first processing unit 435 does not have access to critical resources such as authentication code memory 414. For example, in the DO178-B standard, the level of criticality, whether it is "critical" or "low-criticality" can be known as a level of assurance. Criticalities of the highest level possess a level-A assurance, meaning that the instructions have been tested and verified to operate as expected all the time. In contrast, low-criticality instructions 405 can have a level D assurance or lower, which signifies that the operation of the instructions has not been fully tested and verified. In the embodiments described herein, an assurance level equivalent to an assurance level greater than D of the D0178-B standard is needed to access authentication code memory 414 and other resources like communication ports, display elements, processing power, and the like on first computer 404. First processing unit 435 does not have access to authentication code memory 414 during the execution of low-criticality instructions 412 to acquire an authentication code for communicating with second computer 404. Therefore, first processing unit 435 must execute code release instructions 411 to acquire an authentication code for communicating with second computer 404. To execute code release instructions 411 while executing low-criticality instructions 405, low-criticality instruction 405 cause a trap or program interrupt to cause first processing unit 445 to execute code release instructions 411.

When first processing unit 435 executes code release instructions 411, first processing unit 435 operates with high level of assurance and can access critical resources on first computer 402. Code release instructions 411 direct first processing unit 435 to access authentication code memory 414, acquire authentication codes for communication with second computer 404, and make the acquired authentication codes available to first processing unit 402 during execution of low-criticality instructions 405. However, first processing unit 402 begins execution of code release instructions 411 resulting from a program interrupt that resulted during the execution of low criticality instructions 405. As first processing unit 435 does not have access to authentication code memory 414 during the execution of low-criticality instructions 405, first processing unit 435 sets a validation indicator 408 during the execution of code release instructions 411. Validation indicator 408 indicates that software of low-criticality has accessed a restricted resource on first computer 402 and the system is in need of validation of the present configuration. For example, code release instructions 411 direct first processing unit 435 to set validation indicator 408 whenever a program interrupt arising during the execution of low-criticality instructions 405 causes first processing unit 435 to execute code release instructions 411. When first processing unit 435 finishes execution of code release instructions 411, first processing unit 435 will recommence execution of low-criticality instructions 405, which now has an authentication code that was retrieved from authentication code memory 414.

As low-criticality instructions 405 direct first processing unit 435 to retrieve authentication codes from authentication code memory 414 by executing code release instructions 411, first processing unit 435, executing low-criticality instructions 405 can transmit authenticated data packets to second computer 404. Upon reception of the data packets from first computer 402. Second processing unit 445 acquires a verification code from verification code memory 622 and compares the verification code against the authentication code in the received data packet. If the authentication code matches the verification code, then second computer 404 proceeds with the request in the data packet as explained in relation to system 100 in FIG. 1. If the authentication code does not match the verification code, then second computer 404 rejects the request in the data packet as explained in relation to system 100.

First processing unit 435 directs validation instructions 403 to execute when first processing unit 435 concludes execution of low-criticality instructions 405. Upon commencing execution of validation instructions 403, first processing unit 435 checks to see whether validation indicator 408 is set. If validation indicator 408 is set, the system requires validation. The system is validated between first computer 402 and second computer 404 to verify that system 400 was not harmed by the operation of low-criticality instructions 405

Validation instructions 403 direct first processing unit 435 to validate system 400 through communication with second computer 404. Validation software 408 directs first processing unit 435 to transmit authentication codes across communication connection 406 to second computer 404 to verify that first processing unit 435 functioned as expected during execution of low-criticality instructions 435. First processing unit 435 also ensures that data received over communication connection 406 is likewise correct. When first processing unit 435 finishes validation of system 400, first processing unit 435 sets validation indicator 408 to indicate that the system 400 was correctly validated.

When system 400 is valid, validation instructions 403 direct first processing unit 435 to transmit another set of authentication codes to second computer 404 for subsequent transmissions between first computer 402 and second computer 404. In some implementations, first computer 402 will transmit a special administrative code to second computer 404 indicating that the attached data packet contains a new set of codes. Alternatively, the administrative code directs second computer 404 to reset the verification codes for future loading. If second computer 404 receives a data packet without the administrative code, second computer 404 will not reset the verification codes in verification code memory 422. Further, first processing unit 435, executing validation instructions 403, will also direct authentication code identifier 412 to identify a new set of authentication codes for future loading. The identification of authentication and verification codes is similar to the identification of authentication and verification codes as discussed with respect to system 100 in FIG. 1. When new authentication codes are stored in authentication code memory 414 and new verification codes are stored in verification code memory 422, first processing unit 435 can execute low-criticality instructions 405 again.

Embodiments have been described where a first computer has critical and low criticality instructions and a second computer has only critical instructions. In some implementations, both the first computer and the second computer have both low-criticality instructions and critical instructions. As such, the descriptions of first computer 402 in FIG. 4, also applies to second computer 404.

Figure 5:
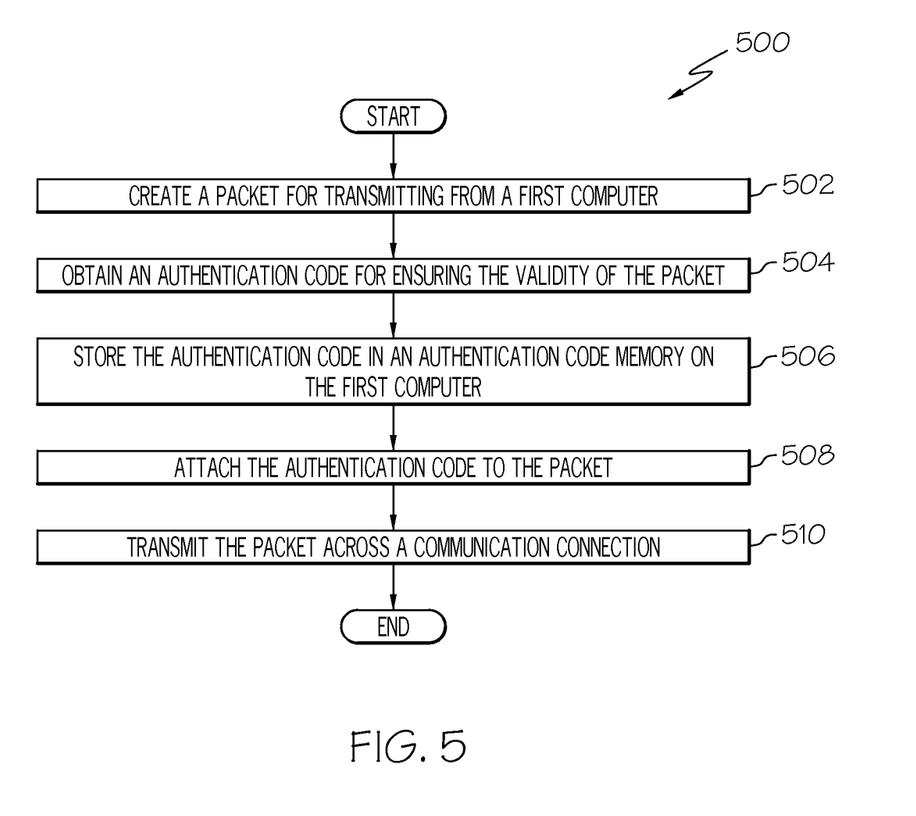
FIG. 5 is a flow diagram depicting one embodiment of a method for secure TFTP communication.

FIG. 5 is a flow diagram depicting one embodiment of a method 500 for secure TFTP communications. At block 502, a packet for transmitting from a first computer is created. For example, a first computer may create a packet containing a read request or a write request to be transmitted to a second computer. At block 504, an authentication code for ensuring the validity of the packet is obtained. For example, the first computer generates an authentication code that will ensure that the second computer verifies the authenticity of the data packet upon reception of the data packet from the first computer. At block 506, the authentication code is stored in an authentication code memory on the first computer. At block 508, the authentication code is attached to the packet. At block 510, the packet is transmitted across a communication connection. For example, the packet with the attached authentication code is transmitted across a communication connection from the first computer to a second computer.

Figure 6:
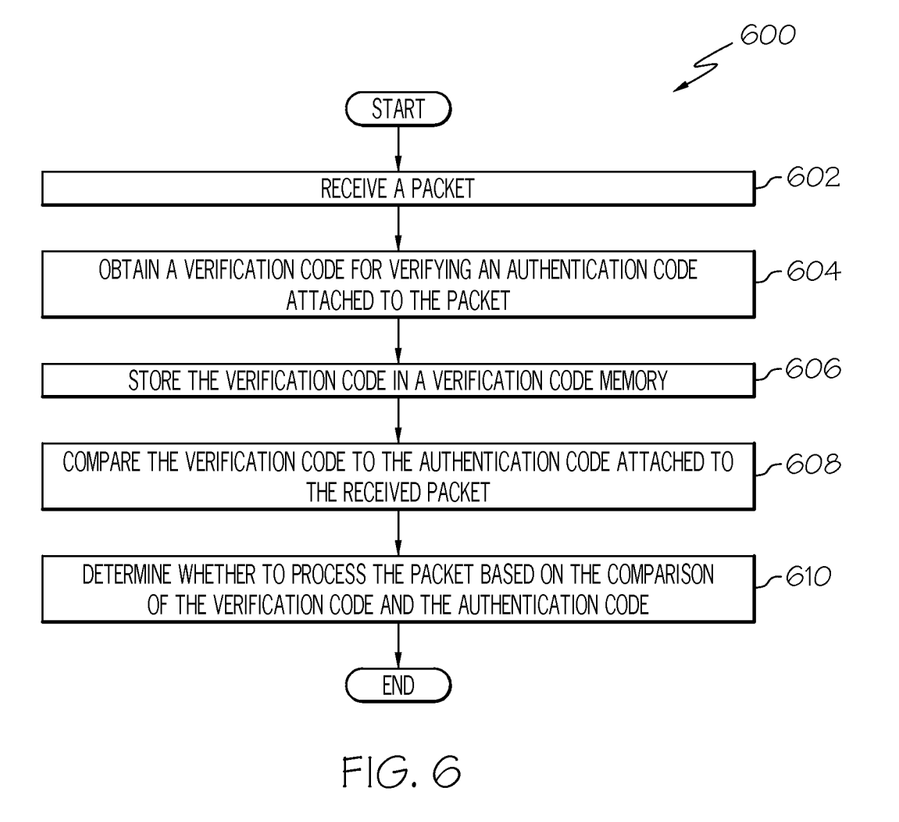
FIG. 6 is a flow diagram depicting one embodiment of a method for secure TFTP communication.

FIG. 6 is a flow diagram depicting one embodiment of a method 600 for secure TFTP communications. At block 602, a packet is received. For example, a second computer receives a packet over a communication connection from a first computer. At block 604, a verification code for verifying an authentication code attached to the packet is obtained. For example, the second computer obtains a verification code from a verification code memory for comparison with an authentication code attached to a packet. At block 606, the verification code is stored in a verification code memory. At block 608, the verification code is compared to the authentication code attached to the received packet. At block 610, a determination is made whether to process the packet based on the comparison of the verification code and the authentication code. For example, the second computer determines whether the authentication code matches the verification code. If the verification code matches the authentication code, the second computer processes the packet. Otherwise, when the verification code and the authentication code fail to match, the second computer will not process the packet.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for secure trivial file transfer protocol (TFTP) communication, the system comprising:
a first computer configured to transmit a packet, the first computer comprising:
an authentication code memory configured to store an authentication code for the packet, the packet comprising:
an operation code that instructs a second computer on how to handle the packet;
a filename indicating a name of a file to be read or written by the second processing unit on the second computer; and
a mode indicator indicating a file transfer mode;
a first processing unit configured to execute communication instructions stored in a first memory, the communication instructions configured to append the authentication code and an authentication option to the packet, the authentication option indicates that the authentication code is appended to the packet, the authentication code obtained from the authentication code memory; and
a first communication port configured to transmit the packet; and
the second computer configured to receive the packet from the first computer, the second computer comprising:
a second communication port configured to receive the packet;
a verification code memory configured to store a verification code for verifying the authentication code in the packet; and
a second processing unit configured to execute verification instructions stored in a second memory, the verification instructions configured to compare the verification code against the authentication code received in the packet, where the second computer rejects the packet if the verification code does not match the authentication code.

2. The system of claim 1, wherein the packet comprises at least one of:
a read request; and
a write request.

3. The system of claim 1, wherein the second computer is further configured to transmit an authorization acknowledgement from the second computer to the first computer when the second processing unit determines that the verification code matches the authentication code in the packet.

4. The system of claim 1, wherein the authentication code memory and the verification code memory store code values were generated by a processing unit implementing a same code generation algorithm.

5. The system of claim 1, wherein the authentication code is a predefined code value stored in the authentication code memory and the verification code memory.

6. The system of claim 1, wherein the first computer and the second computer are configured to exchange authentication codes before transmission of packets between the first computer and the second computer.

7. The system of claim 1, wherein the first computer is configured to attach a different authentication code for each packet in a plurality of packets transmitted to the second computer.

8. The system of claim 1, wherein the first computer is connected to the second computer through at least one of:
a wireless connection; and
a physical connection.

9. The system of claim 1, wherein the first processing unit is configured to execute critical instructions and low-criticality instructions, wherein:
the low-criticality instructions are configured to communicate with the second computer, the low-criticality instructions receiving authentication codes from the authentication code memory through the execution of the critical instructions;
the critical instructions are configured to control the authentication code memory and set a validation indicator in the first memory when execution of the critical instructions accesses the authentication code memory and pass an authentication code to the low-criticality instructions, the validation indicator configured to indicate that the first processing unit should validate a configuration of the first computer.

10. The system of claim 9, wherein the first processing unit executes the critical instructions to transmit authentication codes to the second computer before the first processing-unit executes the low-criticality instructions.

11. The system of claim 9, wherein the first processing unit, upon executing the critical instructions, generates a critical administrative code to authorize the transmission of authentication codes between the first computer and the second computer.

12. A method for authorizing trivial file transfer protocol (TFTP) communications, the method comprising:
creating a packet for transmitting from a first computer, the packet comprising:
an operation code that instructs a computer on how to handle the packet;
a filename indicating a name of a file to be read or written by a processing unit on the computer; and
a mode indicator indicating a file transfer mode;
obtaining an authentication code for ensuring validity of the packet;
storing the authentication code in an authentication code memory on the first computer;
appending the authentication code and an authentication option to the packet, the authentication option indicates that the authentication code is appended to the packet;
transmitting the packet across a communication connection;
receiving the packet from a communication connection on a second computer;
obtaining a verification code for verifying the authentication code attached to the packet;
storing the verification code in a verification code memory on the second computer;
comparing the verification code to the authentication code attached to the received packet; and
determining whether to process the packet based on the comparison of the verification code and the authentication code.

13. The method of claim 12, wherein creating the packet for transmitting from the first computer comprises executing low-criticality instructions by a processing unit, wherein the processing unit has limited access to the authentication code memory during the execution of the low-criticality instructions.

14. The method of claim 13, wherein attaching the authentication code to the packet comprises:
executing the low-criticality instructions on the processing unit;
creating an authentication code request during the execution of the low-criticality instructions, the authentication code request configured to request an authentication code from the authentication code memory;
executing critical instructions on the processing unit, wherein the processing unit can access the authentication code memory during execution of the critical instructions;
setting a validation indicator in a memory, wherein the validation indicator signifies that a configuration of the first computer requires validation;
obtaining the authentication code from the authentication code memory during the execution of the critical instructions;
providing the authentication code so the processing unit can access the authentication code during the execution of low-criticality instructions; and
placing the authentication code in the packet during the execution of low-criticality instructions.

15. The method claim 12, wherein obtaining the authentication code comprise at least one of:
generating the authentication code;
identifying the authentication code in a predefined set of code values; and
identifying the authentication code in a set of code values received from a second computer.

16. A program product comprising a non-transitory processor-readable storage medium on which program instructions are embodied, where the program instructions are configured, when executed by at least one programmable processor, to cause the at least one programmable processor to:
create a packet for transmitting from a first computer, where the packet is a trivial file transfer protocol (TFTP) packet, the packet comprising:
an operation code that instructs a computer on how to handle the packet;
a filename indicating a name of a file to be read or written by a processing unit on the computer; and
a mode indicator indicating a file transfer mode;
obtain an authentication code for ensuring validity of the packet;
store the authentication code in an authentication code memory on the first computer;
append the authentication code and an authentication option to the packet, the authentication option indicates that the authentication code is appended to the packet; and
transmit the packet across a communication connection to a second computer comprising at least one second programmable processor, where second program instructions when executed cause the at least one second programmable processor to;
receive the packet from a communication connection on the second computer;
obtain a verification code for verifying the authentication code attached to the packet;
store the verification code in a verification code memory on the second computer;
compare the verification code to the authentication code attached to the received packet; and
determine whether to process the packet based on the comparison of the verification code and the authentication code.

17. The program product of claim 16, wherein the program instructions when executed are further configured to cause at least one programmable processor to attach the authentication code to the packet by
receiving a request for an authentication code;
setting a validation indicator, wherein the validation indicator signifies that a configuration of the first computer requires validation;
obtaining the authentication code from the authentication code memory; and
passing the authentication code to a low-criticality application.

18. The program product of claim 16, wherein the program instructions when executed are further configured to cause at least one programmable processor to obtain an authentication code for ensuring validity of the packet by at least one of:
generating the authentication code;
identifying the authentication code in a predefined set of code values; and
identifying the authentication code in a set of code values received from a second computer.

* * * * *